(12) United States Patent
Mason

(10) Patent No.: X6047
(45) Date of Patent: Jun. 24, 1830

(54) SPINING, SPEEDER, COTTON, ROPING

(76) Inventor: Samuel P. Mason

Samuel P. Mason
Letters Patent dated June 24. 1830. Expired Dec. 29 1830.

The Schedule referred to in these Letters Patent and making part of the same containing a description in the words of the said Samuel P. Mason himself of his improvement in the "Speeder for making Cotton Roving" patented to him on the 24 day of June 1830, which patent being hereby cancelled on account of a defective specification The essential principle which constitutes the Invention which I claim in the Speeder for making Cotton Roving, and which distinguishes it from all other Speeders now in use: consists in the peculiar structure of the Spindle, and the application of the flyer to that spindle, and is thus described. The Spindle is made of cast steel, or iron, round and tubular or hollow, for more than half its length, commencing at the bottom or foot of the spindle, On one side of which is a slot or groove commencing about two inches from the foot and running along its side as far towards the top as the spindle is tubular; and within this tubular or hollow spindle is fitted another spindle, at the extremity of which is a spring which rises out of the tubular spindle through the slot: At the other extremity of this inner spindle is a head with a deep groove made of brass or any other metal). This tubular Spindle has a bearing turned at the top, of sufficient length to give it a bearing on the nose of the flyer in which it revolves. At the bottom of this hollow spindle is attached a pulley which drives it by means of a belt. There is also a pulley attached to the bottom of the flyer, through the centre of which there is an aperture to admit the passage of the spindle, on which the flyer has a bearing, and revolves.
Between the flyer pulley and Spindle pulley, the spindle has another bearing on which it revolves, and near this bearing and between the pullies, the spindle has a groove turned round it, to admit the slide which keeps the spindle in its place while in operation: Vide drawing Fig 2. 3. 5. The different parts of machinery embraced by this improvement are particularized as follows.

There is a frame of wood or iron to support the several parts. On the
top of one of the sides is a set of fluted rollers, with top rollers.
The first motion of the machine is produced by belting on to a pulley
which is firmly fixed to the front Roller and the motion is continued
to the middle and back rollers by means of gearing. on a level with the
Rollers at right angles to them, are horizontally placed the spindles
and flyers with their bearings at both ends on two cross girts
From one end of the front Roller is geared at right angles a shaft lying
horizontally and parallel with the Spindles; Near the end and on this
Shaft is a pulley which gives motion to the flyers by means of a belt run
ning over, and under alternately, the flyer pullies. From the other end
of the front Roller is also geared a horizontal shaft at right angles
to the rollers upon which is a wooden Cone which I term the driving
Cone; parallel with this is another Cone which receives its motion
from the driving Cone by means of a belt running from the driving
Cone under a friction pulley: At the extremity of the receiving cone
shaft is a pulley which drives the spindles by means of a belt running
over and under the spindle pullies. On the driving Cone shaft is a pulley
which gives motion by means of a belt, to a shaft lying horizontally un-
der the driving Cone. On this shaft is a cylinder upon which lies a bobbin
with a spindle or shaft running through its barrel; on one end of which
is a worm playing into the teeth of a wheel upon an upright shaft
Near the bottom of this shaft, is geared a horizontal shaft at right an-
gles, which is geared at the other end into a perpendicular shaft; pla
ced in the centre of a carriage which traverses on a rail way under
the spindles. On this perpendicular shaft is a half wheel which gears
into two racks fixed upon the carriage and playing alternately in each
rack gives the carriage its back and forward motion
Parallel to the bobbin upon the cylinder, is another ~~bobbin~~ filled with
cord of the same size as the roving that you wish to make. This cord
is taken up when the machine is in motion by the bobbin on the
cylinder and thus as it fills moves slower, and causes the carriage
and also the slides within the spindles, which are attached to the to the carriage to move slower. and thus enables the flyers to lay
the roving in regular layers on the spools as they traverse back and
forth on the Spindles by means of the traverse motion of the car-
riage. There is a sliding rack with graduated teeth placed be-
tween the two horizontal cones. with a friction pulley at one end.
Above this rack are two hammers with arms running downwards
by the side of the horizontal shaft. and on this shaft is a dog or
projecting finger. Upon every half revolution of this shaft the dog
presses against the hammer arm thereby raising the hammer from
the tooth of the rack above and permitting it to move along by means
of a weight attached to one end by a belt or cord. and thus
moves or slides the cone belt which runs under the friction pulley
until the rack is checked by the other hammer which catches
into the next tooth of the rack. when the dog or projecting finger
relieves the arm it is moved back to its former position by
a spring on the opposite side of the arm which presses it back
and brings the hammer down upon the rack.

The cotton is brought in cans to the speeder and passing over the
drawing Rollers. and thence thro' the nose of the flyer and copper
guides, along the inner side of the flyers and receives its twist. and
is then laid in layers on the spools until they are filled.

The slide which secures the spindles in their places when the ma-
chine is in operation is drawn back and the spindles are then
drawn back from the nose of the flyers a sufficient distance to ad-
mit of taking off the spools of roving. and a new set of spools put
on. The spindles are then pushed back to their places and secu-
red by the slide or catch and the regulator bobbins reversed; the cone
belt and Rack are also slipped forward.

Instead of the regulator bobbins and cords, Cones may be substi-
tuted to perform the same office, and Gear Wheels instead of
pullies and belts may be used to drive the spindles and flyers [illegible]
and the [illegible] is intended equally to embrace all positions in which the spindles [illegible]
of my construction may be placed whether horizontally perpendicularly or diagonally.

Witnesses { [illegible]
Henry [illegible] (1261 words)

Samuel S. Mason